United States Patent [19]
Goto et al.

[11] Patent Number: 5,764,941
[45] Date of Patent: Jun. 9, 1998

[54] OPERATING CIRCUIT AND METHOD FOR PROCESSING SIGNALS IN ADPCM SYSTEM

[75] Inventors: Koji Goto; Satoru Kinoshita, both of Tokyo, Japan

[73] Assignee: Mitsubishi Denki Kabushiki Kaisha, Tokyo, Japan

[21] Appl. No.: 580,085

[22] Filed: Dec. 20, 1995

[30] Foreign Application Priority Data

Jul. 24, 1995 [JP] Japan .................................. 7-187260

[51] Int. Cl.[6] .............................. G06F 9/32; G06F 9/355
[52] U.S. Cl. .................... 395/385; 395/387; 364/DIG. 1; 364/DIG. 2
[58] Field of Search ........................... 395/565, 808, 395/394, 200.01, 581, 569, 800, 595, 393, 421.03, 591, 387, 490, 825, 800.23, 800.41, 412, 385, 421.02; 364/DIG. 1, DIG. 2

[56] References Cited

U.S. PATENT DOCUMENTS

| | | | |
|---|---|---|---|
| 3,979,725 | 9/1976 | Disparte et al. | 395/583 |
| 4,090,250 | 5/1978 | Carlson et al. | 395/581 |
| 4,891,754 | 1/1990 | Boreland | 395/595 |
| 5,161,247 | 11/1992 | Murakami | 395/800.36 |
| 5,410,660 | 4/1995 | Divine et al. | 395/581 |
| 5,450,555 | 9/1995 | Brown, III et al. | 395/569 |

OTHER PUBLICATIONS

"ADPCM Encoder/Decoder"; International Telecommunication Union Recommendation G.726; 1990.
Bodner, et al. "Accelerated Instruction Execution of BC/JC Instructions." IBM® Technical Disclosure Bulletin vol. 19, No. 3 Aug., 1976 (pp. 1051–1053).

*Primary Examiner*—Daniel H. Pan
*Attorney, Agent, or Firm*—Leydig, Voit & Mayer, Ltd.

[57] ABSTRACT

An operating circuit carrying out a conditional branch to judge a value level of a calculated result output from an arithmetic logic unit (ALU) during one machine cycle, using an address unit, realizes shorter processing time and low power consumption. The operating circuit sequentially carries out calculations according to command codes in a command ROM and includes a result register for storing and outputting the calculated result of the ALU; a value level judgement mechanism for judging a value level of an output of the result register; a latch for storing a current value of a program counter; an adder for calculating a next value of a program counter by adding a value level judgement result from the value level judgement mechanism and a current value of the program counter stored in the latch; and a first selector for selecting an added result and for deciding a next command address in the command ROM, a conditional branch being carried out to a command address corresponding to a value level obtained for the calculated result from the ALU.

22 Claims, 20 Drawing Sheets

| JUDGEMENT RANGE | RESULT REGISTER OUTPUT (X) | JUDGEMENT RESULT (n) |
|---|---|---|
| ~ 16384 | ~ 100 0000 0000 0000 | 100 0000 0000 0000 |
| 16383 ~ 8192 | 011 1111 1111 1111 ~ 010 0000 0000 0000 | 010 0000 0000 0000 |
| 8191 ~ 4096 | 001 1111 1111 1111 ~ 001 0000 0000 0000 | 001 0000 0000 0000 |
| 4095 ~ 2048 | 000 1111 1111 1111 ~ 000 1000 0000 0000 | 000 1000 0000 0000 |
| 2047 ~ 1024 | 000 0111 1111 1111 ~ 000 0100 0000 0000 | 000 0100 0000 0000 |
| 1023 ~ 512 | 000 0011 1111 1111 ~ 000 0010 0000 0000 | 000 0010 0000 0000 |
| 511 ~ 256 | 000 0001 1111 1111 ~ 000 0001 0000 0000 | 000 0001 0000 0000 |
| 255 ~ 128 | 000 0000 1111 1111 ~ 000 0000 1000 0000 | 000 0000 1000 0000 |
| 127 ~ 64 | 000 0000 0111 1111 ~ 000 0000 0100 0000 | 000 0000 0100 0000 |
| 63 ~ 32 | 000 0000 0011 1111 ~ 000 0000 0010 0000 | 000 0000 0010 0000 |
| 31 ~ 16 | 000 0000 0001 1111 ~ 000 0000 0001 0000 | 000 0000 0001 0000 |
| 15 ~ 8 | 000 0000 0000 1111 ~ 000 0000 0000 1000 | 000 0000 0000 1000 |
| 7 ~ 4 | 000 0000 0000 0111 ~ 000 0000 0000 0100 | 000 0000 0000 0100 |
| 3 ~ 2 | 000 0000 0000 0011 ~ 000 0000 0000 0010 | 000 0000 0000 0010 |
| 1 | 000 0000 0000 0001 | 000 0000 0000 0001 |
| 0 | 000 0000 0000 0000 | 000 0000 0000 0000 |

FIG. 4

| VALUE LEVEL | VALUE LEVEL JUDGEMENT RANGE | RESULT REGISTER OUTPUT (X) | VALUE LEVEL JUDGEMENT RESULT (n) |
|---|---|---|---|
| 16 | ~ 16384 | 100 0000 0000 0000 | 10000 |
| 15 | 16383 ~ 8192 | 010 0000 0000 0000 | 01111 |
| 14 | 8191 ~ 4096 | 001 0000 0000 0000 | 01110 |
| 13 | 4095 ~ 2048 | 000 1000 0000 0000 | 01101 |
| 12 | 2047 ~ 1024 | 000 0100 0000 0000 | 01100 |
| 11 | 1023 ~ 512 | 000 0010 0000 0000 | 01011 |
| 10 | 511 ~ 256 | 000 0001 0000 0000 | 01010 |
| 9 | 255 ~ 128 | 000 0000 1000 0000 | 01001 |
| 8 | 127 ~ 64 | 000 0000 0100 0000 | 01000 |
| 7 | 63 ~ 32 | 000 0000 0010 0000 | 00111 |
| 6 | 31 ~ 16 | 000 0000 0001 0000 | 00110 |
| 5 | 15 ~ 8 | 000 0000 0000 1000 | 00101 |
| 4 | 7 ~ 4 | 000 0000 0000 0100 | 00100 |
| 3 | 3 ~ 2 | 000 0000 0000 0010 | 00011 |
| 2 | 1 | 000 0000 0000 0001 | 00010 |
| 1 | 0 | 000 0000 0000 0000 | 00001 |

FIG. 7

| VALUE JUDGEMENT VALUE | | VALUE JUDGEMENT RESULT |
|---|---|---|
| DECIMAL NUMBER | BINARY NUMBER | |
| 15 | 1111 | 10000 |
| 14 | 1110 | 01111 |
| 13 | 1101 | 01110 |
| 12 | 1100 | 01101 |
| 11 | 1011 | 01100 |
| 10 | 1010 | 01011 |
| 9 | 1001 | 01010 |
| 8 | 1000 | 01001 |
| 7 | 0111 | 01000 |
| 6 | 0110 | 00111 |
| 5 | 0101 | 00110 |
| 4 | 0100 | 00101 |
| 3 | 0011 | 00100 |
| 2 | 0010 | 00011 |
| 1 | 0001 | 00010 |
| 0 | 0000 | 00001 |

(PART 1)

| ADDRESS | COMMAND |
|---|---|
| 0000000 H | SUBSTITUTE 128 FOR Y |
| 0000001 H | SUBSTITUTE X-Y FOR Z |
| 0000010 H | JUMP TO 0101000H IF Z≧0 |
| 0000011 H | SUBSTITUTE 8 FOR Y |
| 0000100 H | SUBSTITUTE X-Y FOR Z |
| 0000101 H | JUMP TO 0010111H IF Z≧0 |
| 0000110 H | SUBSTITUTE 2 FOR Y |
| 0000111 H | SUBSTITUTE X-Y FOR Z |
| 0001000 H | JUMP TO 0010000H IF Z≧0 |
| 0001001 H | SUBSTITUTE 1 FOR Y |
| 0001010 H | SUBSTITUTE X-Y FOR Z |
| 0001011 H | JUMP TO 0001110H IF Z≧0 |
| 0001100 H | PROCESSING IN CASE OF X=0 |
| 0001101 H | UNCONDITIONAL JUMP TO 1001100H |
| 0001110 H | PROCESSING IN CASE OF X=1 |
| 0001111 H | UNCONDITIONAL JUMP TO 1001100H |
| 0010000 H | SUBSTITUTE 4 FOR Y |
| 0010001 H | SUBSTITUTE X-Y FOR Z |
| 0010010 H | JUMP TO 0010101H IF Z≧0 |
| 0010011 H | PROCESSING IN CASE OF 3≧X≧2 |
| 0010100 H | PROCESSING IN CASE OF 7≧X≧4 |
| 0010101 H | UNCONDITIONAL JUMP TO 1001100H |
| 0010110 H | UNCONDITIONAL JUMP TO 1001100H |
| 0010111 H | SUBSTITUTE 32 FOR Y |
| 0011000 H | SUBSTITUTE X-Y FOR Z |
| 0011001 H | JUMP TO 0100001H IF Z≧0 |
| 0011010 H | SUBSTITUTE 16 FOR Y |
| 0011011 H | SUBSTITUTE X-Y FOR Z |
| 0011100 H | JUMP TO 0011111H IF Z≧0 |
| 0011101 H | PROCESSING IN CASE OF 15≧X≧8 |
| 0011110 H | UNCONDITIONAL JUMP TO 1001100H |
| 0011111 H | PROCESSING IN CASE OF 31≧X≧16 |
| 0100000 H | UNCONDITIONAL JUMP TO 1001100H |
| 0100001 H | SUBSTITUTE 64 FOR Y |
| 0100010 H | SUBSTITUTE X-Y FOR Z |
| 0100011 H | JUMP TO 0100110H IF Z≧0 |
| 0100100 H | PROCESSING IN CASE OF 63≧X≧32 |
| 0100101 H | UNCONDITIONAL JUMP TO 1001100H |
| 0100110 H | PROCESSING IN CASE OF 127≧X≧64 |
| 0100111 H | UNCONDITIONAL JUMP TO 1001100H |

FIG. 16A (PRIOR ART)

(PART 2)

| ADDRESS | COMMAND |
|---|---|
| 0101000 H | SUBSTITUTE 2048 FOR Y |
| 0101001 H | SUBSTITUTE X-Y FOR Z |
| 0101010 H | JUMP TO 0111100H IF Z≧0 |
| 0101011 H | SUBSTITUTE 512 FOR Y |
| 0101100 H | SUBSTITUTE X-Y FOR Z |
| 0101101 H | JUMP TO 0110101H IF Z≧0 |
| 0101110 H | SUBSTITUTE 256 FOR Y |
| 0101111 H | SUBSTITUTE X-Y FOR Z |
| 0110000 H | JUMP TO 0110011H IF Z≧0 |
| 0110001 H | PROCESSING IN CASE OF 255≧X≧128 |
| 0110010 H | UNCONDITIONAL JUMP TO 1001100H |
| 0110011 H | PROCESSING IN CASE OF 511≧X≧256 |
| 0110100 H | UNCONDITIONAL JUMP TO 1001100H |
| 0110101 H | SUBSTITUTE 1024 FOR Y |
| 0110110 H | SUBSTITUTE X-Y FOR Z |
| 0110111 H | JUMP TO 0111010H IF Z≧0 |
| 0111000 H | PROCESSING IN CASE OF 1023≧X≧512 |
| 0111001 H | UNCONDITIONAL JUMP TO 1001100H |
| 0111010 H | PROCESSING IN CASE OF 2047≧X≧1024 |
| 0111011 H | UNCONDITIONAL JUMP TO 1001100H |
| 0111100 H | SUBSTITUTE 8192 FOR Y |
| 0111101 H | SUBSTITUTE X-Y FOR Z |
| 0111110 H | JUMP TO 1000110H IF Z≧0 |
| 0111111 H | SUBSTITUTE 4096 FOR Y |
| 1000000 H | SUBSTITUTE X-Y FOR Z |
| 1000001 H | JUMP TO 1000100H IF Z≧0 |
| 1000010 H | PROCESSING IN CASE OF 4095≧X≧2048 |
| 1000011 H | UNCONDITIONAL JUMP TO 1001100H |
| 1000100 H | PROCESSING IN CASE OF 8191≧X≧4096 |
| 1000101 H | UNCONDITIONAL JUMP TO 1001100H |
| 1000110 H | SUBSTITUTE 16384 FOR Y |
| 1000111 H | SUBSTITUTE X-Y FOR Z |
| 1001000 H | JUMP TO 1001011H IF Z≧0 |
| 1001001 H | PROCESSING IN CASE OF 16383≧X≧8192 |
| 1001010 H | UNCONDITIONAL JUMP TO 1001100H |
| 1001011 H | PROCESSING IN CASE OF X≧16384 |
| 1001100 H | NEXT COMMAND |

FIG. 16B (PRIOR ART)

(PART 1)

| ADDRESS | COMMAND |
|---|---|
| 0000000 H | SUBSTITUTE 8 FOR Y |
| 0000001 H | SUBSTITUTE X-Y FOR Z |
| 0000010 H | JUMP TO 0101000H IF Z≧0 |
| 0000011 H | SUBSTITUTE 4 FOR Y |
| 0000100 H | SUBSTITUTE X-Y FOR Z |
| 0000101 H | JUMP TO 0010111H IF Z≧0 |
| 0000110 H | SUBSTITUTE 2 FOR Y |
| 0000111 H | SUBSTITUTE X-Y FOR Z |
| 0001000 H | JUMP TO 0010000H IF Z≧0 |
| 0001001 H | SUBSTITUTE 1 FOR Y |
| 0001010 H | SUBSTITUTE X-Y FOR Z |
| 0001011 H | JUMP TO 0001110H IF Z≧0 |
| 0001100 H | PROCESSING IN CASE OF X=0 |
| 0001101 H | UNCONDITIONAL JUMP TO 1001100H |
| 0001110 H | PROCESSING IN CASE OF X=1 |
| 0001111 H | UNCONDITIONAL JUMP TO 1001100H |
| 0010000 H | SUBSTITUTE 3 FOR Y |
| 0010001 H | SUBSTITUTE X-Y FOR Z |
| 0010010 H | JUMP TO 0010101H IF Z≧0 |
| 0010011 H | PROCESSING IN CASE OF X=2 |
| 0010100 H | UNCONDITIONAL JUMP TO 1001100H |
| 0010101 H | PROCESSING IN CASE OF X=3 |
| 0010110 H | UNCONDITIONAL JUMP TO 1001100H |
| 0010111 H | SUBSTITUTE 6 FOR Y |
| 0011000 H | SUBSTITUTE X-Y FOR Z |
| 0011001 H | JUMP TO 0100001H IF Z≧0 |
| 0011010 H | SUBSTITUTE 5 FOR Y |
| 0011011 H | SUBSTITUTE X-Y FOR Z |
| 0011100 H | JUMP TO 0011111H IF Z≧0 |
| 0011101 H | PROCESSING IN CASE OF X=4 |
| 0011110 H | UNCONDITIONAL JUMP TO 1001100H |
| 0011111 H | PROCESSING IN CASE OF X=5 |
| 0100000 H | UNCONDITIONAL JUMP TO 1001100H |
| 0100001 H | SUBSTITUTE 7 FOR Y |
| 0100010 H | SUBSTITUTE X-Y FOR Z |
| 0100011 H | JUMP TO 0100110H IF Z≧0 |
| 0100100 H | PROCESSING IN CASE OF X=6 |
| 0100101 H | UNCONDITIONAL JUMP TO 1001100H |
| 0100110 H | PROCESSING IN CASE OF X=7 |
| 0100111 H | UNCONDITIONAL JUMP TO 1001100H |

FIG. 18A (PRIOR ART)

(PART 2)

| ADDRESS | COMMAND |
|---|---|
| 0101000 H | SUBSTITUTE 12 FOR Y |
| 0101001 H | SUBSTITUTE X-Y FOR Z |
| 0101010 H | JUMP TO 0111100H IF Z≧0 |
| 0101011 H | SUBSTITUTE 10 FOR Y |
| 0101100 H | SUBSTITUTE X-Y FOR Z |
| 0101101 H | JUMP TO 0110101H IF Z≧0 |
| 0101110 H | SUBSTITUTE 9 FOR Y |
| 0101111 H | SUBSTITUTE X-Y FOR Z |
| 0110000 H | JUMP TO 0110011H IF Z≧0 |
| 0110001 H | PROCESSING IN CASE OF X=8 |
| 0110010 H | UNCONDITIONAL JUMP TO 1001100H |
| 0110011 H | PROCESSING IN CASE OF X=9 |
| 0110100 H | UNCONDITIONAL JUMP TO 1001100H |
| 0110101 H | SUBSTITUTE 11 FOR Y |
| 0110110 H | SUBSTITUTE X-Y FOR Z |
| 0110111 H | JUMP TO 0111010H IF Z≧0 |
| 0111000 H | PROCESSING IN CASE OF X=10 |
| 0111001 H | UNCONDITIONAL JUMP TO 1001100H |
| 0111010 H | PROCESSING IN CASE OF X=11 |
| 0111011 H | UNCONDITIONAL JUMP TO 1001100H |
| 0111100 H | SUBSTITUTE 14 FOR Y |
| 0111101 H | SUBSTITUTE X-Y FOR Z |
| 0111110 H | JUMP TO 1000110H IF Z≧0 |
| 0111111 H | SUBSTITUTE 13 FOR Y |
| 1000000 H | SUBSTITUTE X-Y FOR Z |
| 1000001 H | JUMP TO 1000100H IF Z≧0 |
| 1000010 H | PROCESSING IN CASE OF X=12 |
| 1000011 H | UNCONDITIONAL JUMP TO 1001100H |
| 1000100 H | PROCESSING IN CASE OF X=13 |
| 1000101 H | UNCONDITIONAL JUMP TO 1001100H |
| 1000110 H | SUBSTITUTE 15 FOR Y |
| 1000111 H | SUBSTITUTE X-Y FOR Z |
| 1001000 H | JUMP TO 1001011H IF Z≧0 |
| 1001001 H | PROCESSING IN CASE OF X=14 |
| 1001010 H | UNCONDITIONAL JUMP TO 1001100H |
| 1001011 H | PROCESSING IN CASE OF X=15 |
| 1001100 H | NEXT COMMAND |

FIG. 18B (PRIOR ART)

OPERATING CIRCUIT AND METHOD FOR PROCESSING SIGNALS IN ADPCM SYSTEM

BACKGROUND OF THE INVENTION

1. Field of Invention

The invention relates to an operating circuit (processor for signal processing) for an ADPCM (Adaptive Differential Pulse Code Modulation) apparatus, more specifically, to an operating circuit in an address unit portion which carries out address setting in a few clock cycles for reading out commands from a command ROM (Read Only Memory) where commands are stored.

2. Description of Prior Art

In digital communication, sound data etc. is compressed before transmission and compressed data is decompressed in a reception side to improve communication efficiency. An ADPCM system defined in G. 726 of the ITU recommendation is an example used to compress sound data. This invention relates to an operating circuit used for signal processing in an ADPCM system. This operating circuit includes hardware exclusively made for an address unit portion which carries out address settings for reading out commands from a command ROM where commands are stored. Being constructed as mentioned above, the operating circuit is able to carry out an operation for reading commands in a few clock cycles at a high-speed and low power consumption.

FIG. 12 shows an ordinary construction of an operating circuit used for an ADPCM apparatus. In FIG. 12, various kinds of command codes are stored in command ROM 28. When a value of program counter 16 which is output data from address unit 29 is inputted in command ROM 28 as address data, this command ROM 28 outputs command codes stored in the corresponding address of command ROM 28 to signal line 30. Command decoder 31 decodes the command codes read out from command ROM 28 and outputs them to signal line 11 to control address unit 29, register file 32 or ALU (Arithmetic Logical Unit) 33 according to types of command codes.

According to an output signal from command decoder 31, register file 32 comprises a plurality of registers (for example, X register, Y register, Z register) for storing a processed result on output signal line 3 of ALU 33. The register file 32 outputs two respective data signals to signal lines 34 and 35. ALU 33 has two inputted data signals 34 and 35 and carries out processing in accordance with decoded command codes on signal line 11 which are outputted from command decoder 31, and then outputs the results to signal line 3. Address unit 29 outputs a value of program counter based on both an output of ALU 33 outputted on signal line 3 and a value of command codes on signal line 11.

FIG. 13 shows an ordinary, conventional construction of address unit 29 shown in FIG. 12. FIG. 14 shows a format of conventional command codes. In FIG. 14, each command format of command codes which carry out a conditional branch or an immediate load is shown, respectively.

In FIG. 14, bits 23, 22 represent kinds of commands (type). When bits 23, 22 are "00", they represent a conditional branch command, while they represent an immediate load command in case of "01". When bits 23, 22 are "00", in other words, at a conditional branch command, bits 21, 20 represent a conditional branch code (br__code) such as "call", "jmp", and "return", and bits 19-16 represent a condition (condition) such as "zro", "one", "neg", "pos", and "uncondition". Bits 10-0 represent jump destination address (jmp address), when bits 19-16 are "01", that is, at a conditional jump command or at an unconditional command. When bits 23, 22 are "01", in other words at an immediate load command, bits 21-6 represent immediate data (imm-data) and bits 5-0 represent a destination address (dst) where immediate data is transferred.

In FIG. 13, result register 1 stores input data on signal line 3 inputted from ALU 33 in response to clock CLKB on signal line 2, and simultaneously outputs a stored value to signal line 4 for FLAG judgement. FLAG judgement circuit 20 carries out FLAG judgement according to kinds (types) of commands included in result data on signal line 4 and command codes on signal line 11, and a conditional branch code (br__code) and a condition (condition), and then outputs a judgement result to signal line 22. For example, when a command kind (type) is "00 (conditional branch)" and a result of ALU matches the condition of the conditional branch, this circuit 20 outputs a command signal to signal line 22 so that selector 23 indicates jmp address to its output line 25, for carrying out a conditional branch indicated by conditional branch code (br__code).

Latch 15 stores a current value of program counter (PC) in response to clock CLKB on signal line 2 and simultaneously outputs the stored value to signal line 17. Adder 18 adds data on signal line 10 and data on signal line 17 and outputs a result to signal line 19. Selector 23 outputs either data on signal line 19 or a jump destination address (jmp address) contained in a command code on signal line 11 to signal line 25, according to FLAG judgement result of an output of FLAG judgement circuit 20. Program counter 26 stores data on signal line 25 and simultaneously outputs a stored value to signal line 16 according to clock CLKC on signal line 27.

The following is a detailed explanation on an operation of address unit 29 shown in FIG. 12 with reference to FIG. 13. FIG. 6 shows timing relationship between machine cycle and clocks (CKLB and CKLC). When clock CLKB on signal line 2 became "H", result register 1 stores a processed result on signal line 3 which is outputted from ALU and simultaneously outputs the stored value to signal line 4.

FLAG judgement circuit 20 judges whether a condition represented by bits 19–16 (condition) matches the result data on signal line 4, when conditional branch code (br__code) in a conditional branch command shown in FIG. 14 is "01" in the command code on signal line 11, namely at a conditional jump command. Program counter 26 stores a current value of program counter and simultaneously outputs the stored value to signal line 16. Adder 18 adds an output from latch 15 which stores a value of program counter (PC) in every machine cycle, and a fixed value "1" to output the result to signal line 19. Selector 23 selects either the data on signal line 19, namely a value of program counter (PC) of machine cycle plus 1, or a jump destination address (jmp address) on signal line 11 according to the FLAG judgement result on signal line 22. A jump destination address (jmp address) is selected only when a result data on signal line 4 matches with a condition (condition). Otherwise, the data on signal line 19, i.e. value of program counter plus 1 is selected and outputted to signal line 25.

As shown in FIG. 6, when clock CLKB on signal line 2 becomes "H", program counter 26, which stores program counter values, outputs a value stored according to clock CLKC on signal line 27, namely a revised value of program counter to signal line 16.

In a conventional circuit, three processes are needed for carrying out one numeric value judgement, namely, loading a threshold value, subtracting the threshold value from an inputted numerical value, and conditionally branching based on the result of subtraction. Since each process needs one machine cycle, three machine cycles are necessary for carrying out just one numeric value judgement.

FIG. 15 shows steps for judging which value level an inputted numerical value X falls in. FIG. 4 shows relationship between the inputted numerical value X (output of result register) and judgement result n. FIGS. 16A, B show command codes stored in command ROM 28. These command codes are properly referred to for carrying out various processes to judge a value level where an inputted numerical value falls in. In FIGS. 16A, B, the term "address" refers to an address of command ROM 28 which corresponds to a value of the program counter. Each capital X, Y, and Z represents a register, or more particularly X denotes a register to store an inputted numerical value, and Y and Z denote registers for calculations. A command code read out from command ROM 28 is outputted to signal line 11.

With reference to FIG. 15, a conventional process of value level judgement is explained briefly as follows. First, it is judged whether an inputted numerical value X is equal to or more than 128 (X≧128). If X is equal to or more than 128, it is judged whether X is equal to or more than 2048 (X≧2048). If X is equal to or more than 2048, it is farther judged whether X is equal to or more than 8192 (X≧8192). If X is equal to or more than 8192, it is further judged whether X is equal to or more than 16384 (X≧16384). If X is equal to or more than 16384, it is finally judged that X belongs to a value level where X is equal to or more than 16384. In this manner, the above processes are repeated many times depending on how large X is, and then the final value level is decided.

For example, in case that numerical value X is 2048, a plurality of steps are carried out as explained below to judge which value level an inputted numerical value X falls in. This process is carried out by sequential execution of command codes in command ROM 28 which correspond to addresses outputted from address unit 29.

Address: command code
0000000H: substituting 128 for Y
0000001H: calculating 2048–128 and then substituting the result 1920 for Z
0000010H: jumping to 0101000H, since Z≧0
0101000H: substituting 2048 for Y
0101001H: calculating 2048–2048 and then substituting the result 0 for Z
0101010H: jumping to 0111100H, since Z≧0
0111100H: substituting 8192 for Y
0111101H: calculating 2048–8192 and then substituting the result –6146 for Z
0111110H: no jumping since Z is less than zero
0111111H: substituting 4096 for Y
1000000H: calculating 2048–4096 and then substituting –2048 for Z
1000001H: no jumping since Z is less than zero
100001H: executing the processing for case of 4095≧X≧2048
0000011H: unconditional jumping to next command address 1001100H In case of conventional value level judgement which uses command codes shown in FIGS. 16A, B, regardless of an inputted numerical value X, twelve machine cycles in total are necessary, that is, 4 calculations for loading a threshold value, 4 calculations for subtracting a threshold value from an inputted numerical value, and 4 conditional branch determinations by judgement of the subtraction result. Furthermore, a process after a conditional branch and a jumping step to the next command each requires one machine cycle, respectively, and therefore the total of necessary machine cycles becomes 14.

Referring to FIGS. 12 and 13, an operation, where the input numerical value is 2048, is explained where different processing is carried out, respectively, in accordance with value levels decided as a result of the value level judgement process according to FIG. 16. A, B. It is assumed that the inputted numerical value 2048 has been pre-loaded in the X register of register file 32.

At the first machine cycle, an immediate value command code "substitute 128 for Y", which is stored in start address "0000000" of command ROM 28 is outputted to signal line 30. Command decoder 31 decodes the command code and outputs it to signal line 11. A threshold value level 128 stored in bits 21–6 in the immediate value command code on signal line 11 is downloaded to the Y register of register file 32, which is represented by bits 5–0. Register file 32 outputs the inputted numerical value X (=2048) to signal line 34 and the threshold value Y (=128) to another signal line 35.

At a second machine cycle, address unit 29 outputs a value of program counter incremented by one, namely "0000001" to command ROM 28. Command ROM 28 recognizes this value as address and executes the command code for subtraction shown in FIG. 16A to calculate 2048–128. Command ROM 28 then outputs subtraction result 1920 to signal line 11. While this same subtraction result 1920 is substituted for Z register in register file 32.

At a third machine cycle, since Z is more than zero, a pointer jumps to address "0101000H" in address unit 29 as shown in FIG. 16B. At a fourth machine cycle, the command code "substituting 2048 for Y" stored in address "0101001H" of command ROM 28 is executed. At fifth machine cycle, the command code "substituting X–Y for Z" stored in "0101001H" of command ROM 28 is executed, where 2048–2048 is calculated and its result "0" is substituted for Z. At a sixth machine cycle, the command code in address "0101010H" of command ROM 28 is executed. In this case, since Z is more than zero, the pointer to jump to address "0111100H" in address unit 29.

At seventh machine cycle, by the command code in address "0111100H" of command ROM 28, 8192 is substituted for Y. At eighth machine cycle, by the command code in address "011101H" of command ROM 28, 2048–8192 is calculated and the subtraction result (–6144) is substituted for Z. At a ninth machine cycle, the command code in address "0111110H" of command ROM 28 is executed, where, since Z is less than zero, the pointer stops further jumping and moves to a command code in the next address "0111111H".

At tenth machine cycle, by the command code in address "0111111H" of command ROM 28, 4096 is substituted for Y. At eleventh machine cycle, by the command code of address "1000000H" of command ROM 28, 2048–4096 is calculated and the result (–2048) is substituted for Z. At twelfth machine cycle, the command code in address "1000001H" of command ROM 28 is executed, and since Z is less than zero, the pointer stops jumping and moves to a command code in the next address "1000010H".

At a thirteenth machine cycle, by the command code in address "1000010H" of command ROM 28, a value level of X is determined as 4095≧X≧2048. At fourteenth machine cycle, by the command code of address "100011H" of command ROM 28, unconditional jump to the next command address "1001100H" is executed.

As explained above, it is concluded that in this conventional value level judgement, a value level corresponding to an inputted numerical value is determined at the fourteenth machine cycle.

FIG. 17 shows a plurality of processing steps to detect which value judgement value shown in FIG. 9 an inputted numerical value falls in. The corresponding command codes are shown in FIGS. 18A, B.

In FIG. 17, conventional processing of value judgement is briefly explained as follows. First of all, it is judged whether an inputted numerical value X is equal to or more than 8. In case of X≧8, it is further judged whether X is equal to or more than 12. In case of X≧12, it is further judged whether X is equal to or more than 14. In case of X≧14, it is further judged whether X is equal to or more than 15. In case of X≧15, X is finally decided that X has avalue of "15", that is (X=15). In such a manner, the above processes are repeated many times depending on how large X is, and then the final value level is decided.

If an inputted numerical value mentioned above is 10, a value judgement is carried out according to FIGS. 18A, B. Command codes of this case is executed by the next sequence.
Address: command code
0000000H: substituting 8 for Y
0000001H: substituting X-Y for Z
0101010H: jumping to 0101000H if Z≧0
0101000H: substituting 12 for Y
0101001H: substituting X-Y for Z
0101010H :jumping to 0111100H if Z≧0
0101011H: substituting 10 for Y
0101100H: substituting X-Y for Z
0101101H: jumping to 0110101H if Z≧0
0110101H: substituting 11 for Y
0110110H: substituting X-Y for Z
0110111H: jumping to 0111010H if Z≧0
0111000H: processing in case of X=10
0111001H: unconditional jumping to 1001100H Referring to circuits shown in FIG. 12 and 13, an operation when an inputted numerical value is 10 is explained concretely as follows. It is assumed that an inputted numerical value 10 has been pre-loaded in X register in register file 32.

At a first machine cycle, an immediate value command code "substitute 8 for Y", which is stored in start address "0000000" of command ROM 28 is outputted to signal line 30. Command decoder 31 decodes command code to output to signal line 11. A threshold value 8 stored in bits 21~6 of the immediate value command code on signal line 11 is downloaded to Y register of register file 32, which is represented by bits 5~0.

At a second machine cycle, address unit 29 outputs a value of program counter incremented just one, namely "0000001" to command ROM 28. Command ROM 28 recognizes this value as address and outputs a command code for subtraction shown in FIG. 18A to command decoder 31. Command decoder 31 decodes the command code to output to signal line 11. By the command code on signal line 11, the command code "substituting X-Y for Z" in address "0000001H" of command ROM 28 is executed in ALU 33, where the result "10–8=2" is stored in the Z register.

At a third machine cycle, the command code "jump to 0101000H if Z is equal to or more than zero" in address 0101010H of command ROM 28 is executed. In this case, since Z=2, this condition is satisfied to cause jump to address "0101010H". At a fourth machine cycle, the command code "substituting 12 for Y" in address 0101000H of command ROM 28 is executed and the result "12" is stored in the Y register. At a fifth machine cycle, the command code "substitute X-Y for Z" in address 0101001H of command ROM 28 is executed and the subtraction result Z=10–12=–2 is stored in the Z register. At a sixth machine cycle, the command code "jumping to 0111100H if Z is equal to or more than zero" in address 0101010H of command ROM 28 is executed. In this case the condition is not satisfied since Z=–2. Accordingly the process moves to the next address "0101011H".

At a seventh machine cycle, the command code "substitute 10 for Y" in address 01010111H of command ROM 28 is executed to put 10 in the Y register. At an eighth machine cycle, the command code "substitute X-Y for Z" in address "0101100H" of command ROM 28 is executed to store Z=10–10=0 in the Z register. At a ninth machine cycle, the command code "jump to address 0110101H if Z is equal to or more than zero" in address "0011101H" of command ROM 28 is executed. In this case the condition is satisfied since Z=0, address "0110101H" of command ROM 28 is transferred to command ROM 28.

At a tenth machine cycle, the command code "substitute 11 for Y" in address "0110101H" of command ROM 28 is executed to store 11 in the Y register. At an eleventh machine cycle, the command code "substitute X-Y for Z" in address "0110110H" of command ROM 28 is executed to store Z=10–11=–1 in the Z register. At a twelfth machine cycle, the command code "jumping to "0111010H" if Z is equal to or more than zero" in address 0110111H of command ROM 28, is executed. In this case since Z=–1 does not satisfy the condition, the pointer moves to the next address "0111000H".

At a thirteenth machine cycle, the command code "processing in case of X=10" in address "0111000H" of command ROM 28, and a value is finally decided at this stage. At a fourteenth machine cycle, the command code "unconditional jumping to 1001100H" in address 0111001H of command ROM 28 is executed, where a whole process comes to an end. As described above, it is concluded that in this conventional value judgement circuit, 14 machine cycles are necessary to determine a value of an inputted numerical value.

In a conventional technology, judgement of value level or value are decided by subtracting a threshold value from an inputted numerical value. Therefore, many subtraction and judgement steps are necessary which consume excessive amounts of processing time. Still another problem has been caused in that many processing cycles increase power consumption. The ADPCM system defined by ITU recommendation G. 726 requires many processing steps for value level judgement or value judgement.

Therefore, it is an object of the present invention to provide an operating circuit for carrying out the processing in fewer steps at a high-speed and with low power consumption.

SUMMARY OF THE INVENTION

According to one aspect of the invention, an operating circuit comprising a command ROM (read only memory) for storing a content of a program, a program counter for appointing an address to said command ROM, a command decoder for decoding a content of said command ROM appointed by said program counter, an arithmetic logical unit (ALU) for calculating contents of a register file according to a decoded result from said command decoder, and an address unit for calculating a next address value in said command ROM according to the calculated results from ALU, the operating circuit sequentially carries out calculations according to the command codes in a command ROM, comprises a result register for storing and outputting an outputted result of ALU; a value level judgement means for judging which value level an output of said result register is included in; a latch means for storing a current value of program counter; an adder means for calculating a next value of program counter by adding a value level judgement result from said value level judgement means and a current value of program counter stored in said latch means; and a first selector means for selecting an added result and for deciding a next command address in said command ROM, where, conditional branch is carried out to a command address which is corresponding to a value level obtained by the calculated result from ALU.

According to another aspect of the invention, an operating circuit comprising a command ROM (read only memory) for storing a content of a program, a program counter for appointing an address to said command ROM, a command decoder for decoding a content of said command ROM appointed by said program counter, an arithmetic logical unit (ALU) for calculating contents of a register file according to a decoded result from said command decoder, and an address unit for calculating a next address value in said command ROM according to the calculated results from ALU, the operating circuit sequentially carries out calculations according to the command codes in a command ROM, comprises a result register for storing and outputting an outputted result of ALU; a value judgement means for incrementing an output of said result register by one; a latch means for storing a current value of program counter; an adder means for calculating a next value of program counter by adding a value judgement result from said value judgement means and a current value of program counter stored in said latch means; and a first selector means for selecting an added result and for deciding a next command address in said command ROM, where, conditional branch is carried out to a command address which is corresponding to a value obtained by the calculated result from ALU.

According to still another aspect of the invention, an operating circuit further comprises a FLAG judgement circuit for decoding kinds of commands (types) from a command decoder, a conditional branch code (br_code) and a condition (condition), depending on an output from said result register, and for outputting a result to said first selector.

According to still another aspect of the invention, an operating circuit further comprises a second selector for selecting a fixed value "1", an output from the decoder, or a value of an address displacement (disp) in the command decoder, according to kinds of commands (types) contained in the output from the command decoder, a conditional branch code (br_code) and a condition (condition).

According to still another aspect of the invention, an operating circuit further comprises a means for appointing a displacement from the current program count value to next program count value and then for allowing program counter value to displace by a displacement value at the same time when the calculation is carried out, in addition to normal operating commands, as a command codes at a destination address where conditional branch is carried out according to value level judgement or value judgement, and where, the operating circuit carries out a branching process after ALU has carried out value level judgement or value judgement.

According to further aspect of the invention, an operating method for sequentially carrying out calculations according to the command codes in a command ROM, using operating circuit which comprises a command ROM (read only memory) for storing a content of a program, a program counter for appointing an address to said command ROM, a command decoder for decoding a content of said command ROM appointed by said program counter, an arithmetic logical unit (ALU) for calculating contents of a register file according to a decoded result from said command decoder, and an address unit for calculating a next address value in said command ROM according to the calculated results from ALU, comprises the steps of: storing and outputting an outputted result of ALU; judging which value level said output is included in; storing a current value of program counter; calculating a next value of program counter by adding a value level judgement result and a current value of program counter; and selecting an added result and for deciding a next command address in said command ROM, where, conditional branch is carried out to a command address which is corresponding to a obtained by the calculated result from ALU.

According to still further aspect of the invention, an operating method for sequentially carrying out calculations according to the command codes in a command ROM, using operating circuit which comprises a command ROM (read only memory) for storing a content of a program, a program counter for appointing an address to said command ROM, a command decoder for decoding a content of said command ROM appointed by said program counter, an arithmetic logical unit (ALU) for calculating contents of a register file according to a decoded result from said command decoder, and an address unit for calculating a next address value in said command ROM according to the calculated results from ALU, comprises the steps of: storing and outputting an outputted result of ALU; incrementing an output of said result register by one; storing a current value of program counter; calculating a next value of program counter by adding said incremented result and said current value of program counter; and selecting an added result and for deciding a next command address in said command ROM, where, conditional branch is carried out to a command address which is corresponding to a value obtained from the calculated result from ALU.

BRIEF DESCRIPTION OF THE DRAWINGS

FIG. 4 shows a judgement range in case of value level judgement.

FIG. 7 shows a correspondence between value level judgement range of the first embodiment of the present invention and a result of value level judgement.

FIG. 9 shows a correspondence between a value judgement value of the second embodiment of the present invention and a result of value judgement.

FIG. 16A shows steps for carrying out a conventional value level judgement stored in command ROM 28 (part 1).

FIG. 16B shows steps for carrying out a conventional value level judgement stored in command ROM 28 (part 2).

FIG. 18A shows steps for carrying out a conventional value judgement stored in command ROM 28 (part 1).

FIG. 18B shows steps for carrying out a conventional value judgement stored in command ROM 28 (part 2).

DETAILED DESCRIPTION OF THE PREFERRED EMBODIMENTS

Embodiment 1

Figure 1:
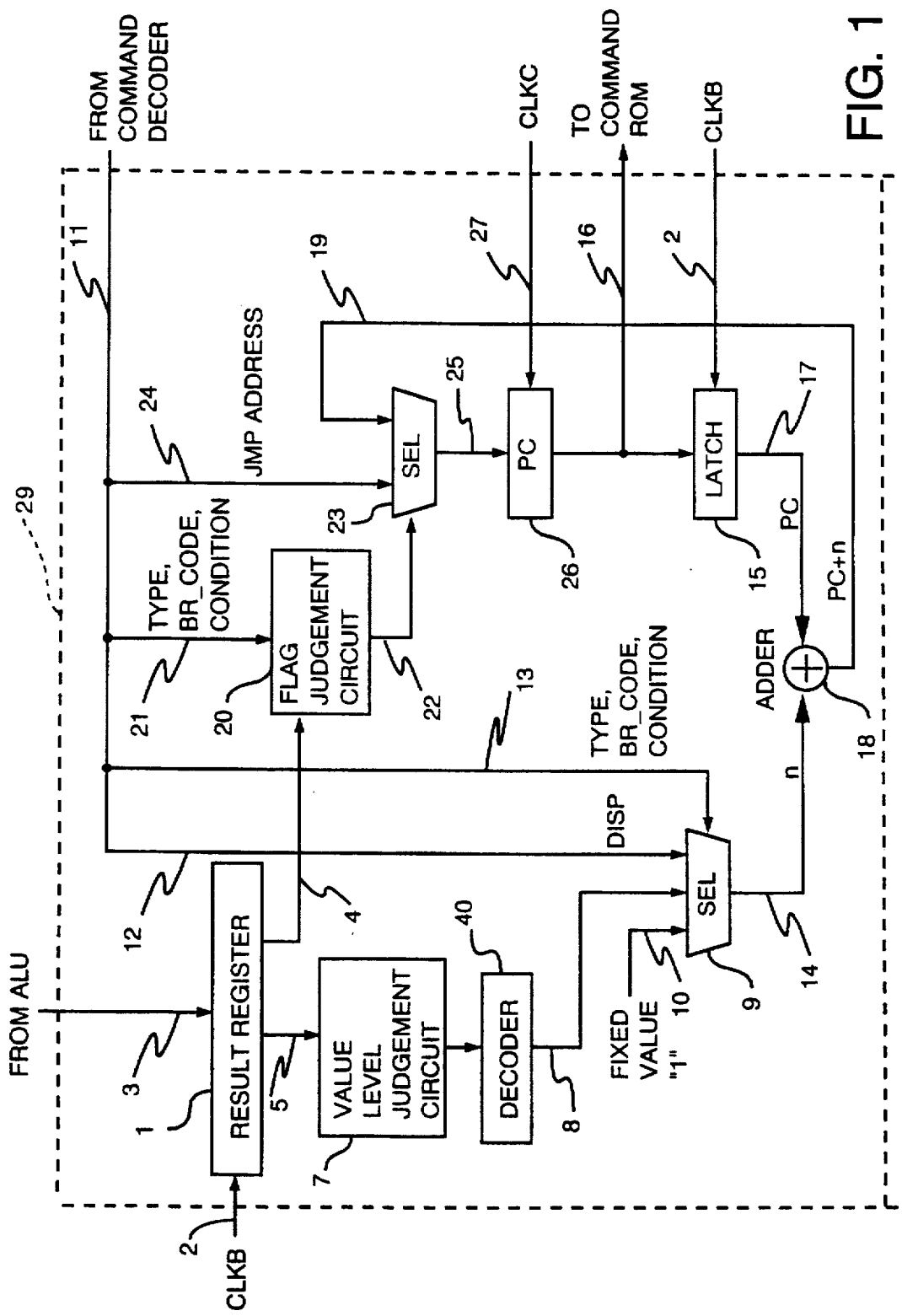
FIG. 1 shows a construction of an address unit of a first embodiment of the present invention.

FIG. 1 is a block diagram of a circuit which carries out value level judgement of an embodiment of the present invention. This block diagram shows an address unit 29 in FIG. 12 of the present invention. The system configuration of the present invention is the same as that depicted in FIG. 12. The present invention includes a specific feature in the hardware construction of address unit 29 which carries out conditional branch operations in fewer machine cycles than the prior art systems.

Figure 3:
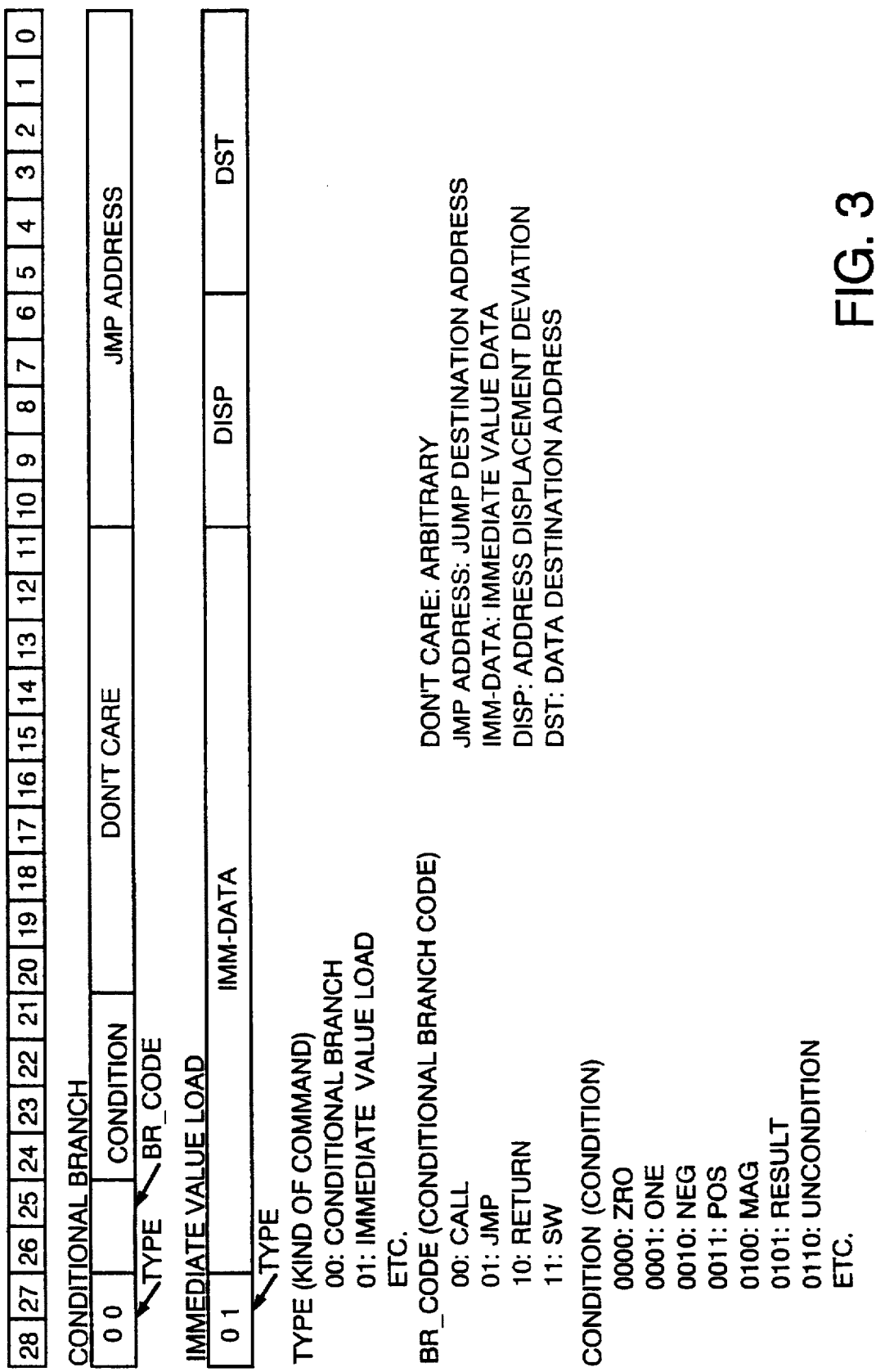
FIG. 3 shows a format of command code used in the embodiments of the present invention.
Figure 12:
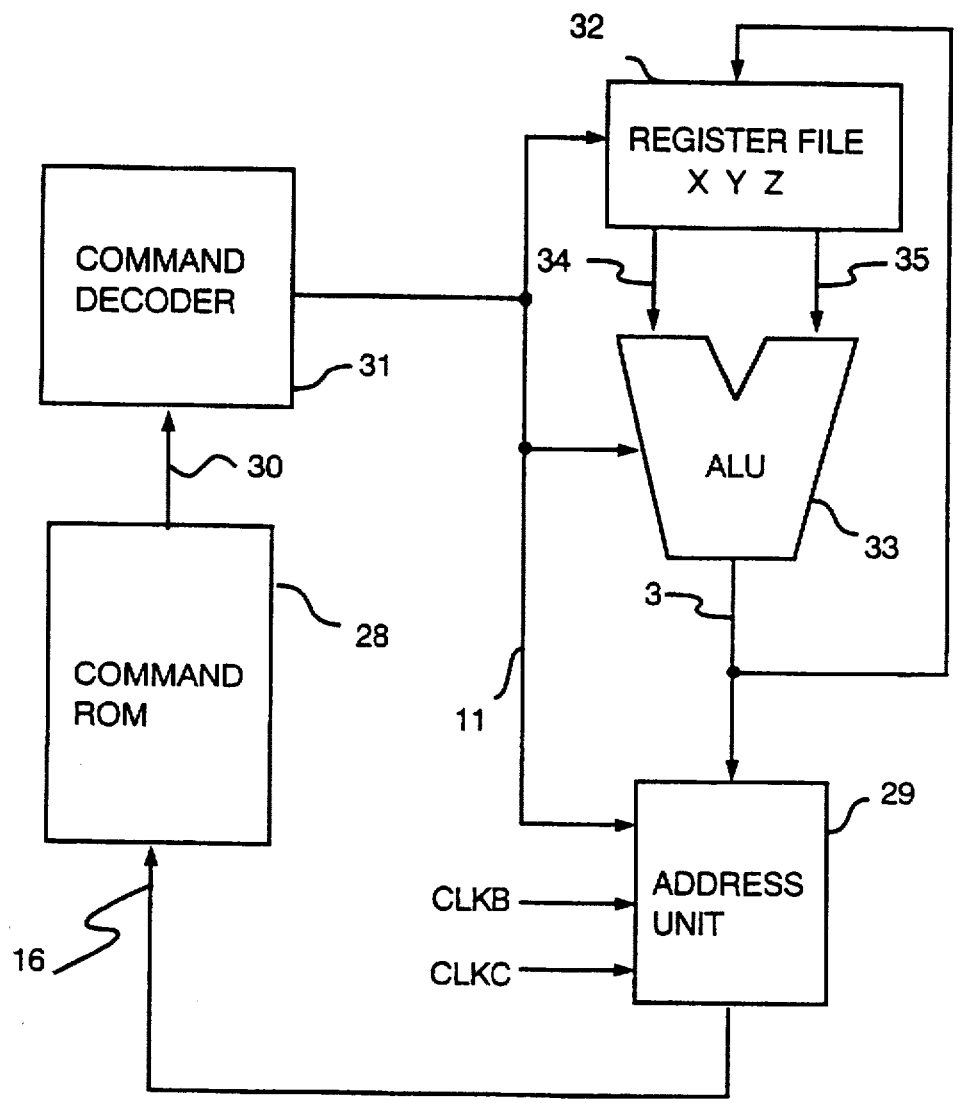
FIG. 12 shows a brief operation of a main portion of ADPCM apparatus where the present invention is used.

First, the conditional branch operation according to value level judgement is explained. A format of command codes on signal line 11 of FIG. 1 and FIG. 12 is explained with reference to FIG. 3. In FIG. 3, bits 28 and 27 designate different kinds of commands. When bits 28 and 27 are "00", they indicate a conditional branch command, while they indicate an immediate load command in case of "01". Bits 26 and 25 represent conditional branch codes (br_code). Value "00" corresponds to "call", "01" to "jimp", "10" to "return", and "11" to "sw" which means "switch". Bits 24~21 represent conditions. Value "0000" corresponds to "zro", "0001" to "one", "0010" to "neg", "0011" to "pos", "0100" to "mag", "0101" to "result", and "0110" to "uncondition". Bits 10~0 represent jump destination addresses (jmp address) when a jump command is executed. Bits 20~11 may have an arbitrary value.

For example, when bits 28, 27 (type) are "00" and bits 26, 25 (conditional branch code (br code)) are "11" (sw), and bits 24~21 are "0100", it represents conditional branch "mag" by a value level judgement. When bits 28, 27 are "00", bits 26, 25 are "11", and bits 24~21 are "0101", it represents conditional branch by value level judgement, namely 'result'. In case of conditional branch by value level judgement, namely "SW command", the next address is decided by "present address"+"condition". Accordingly, it is not necessary to appoint an absolute address of a jump destination. Therefore, a jump destination address for bits 10~0 may be any arbitrary values.

Figure 5:
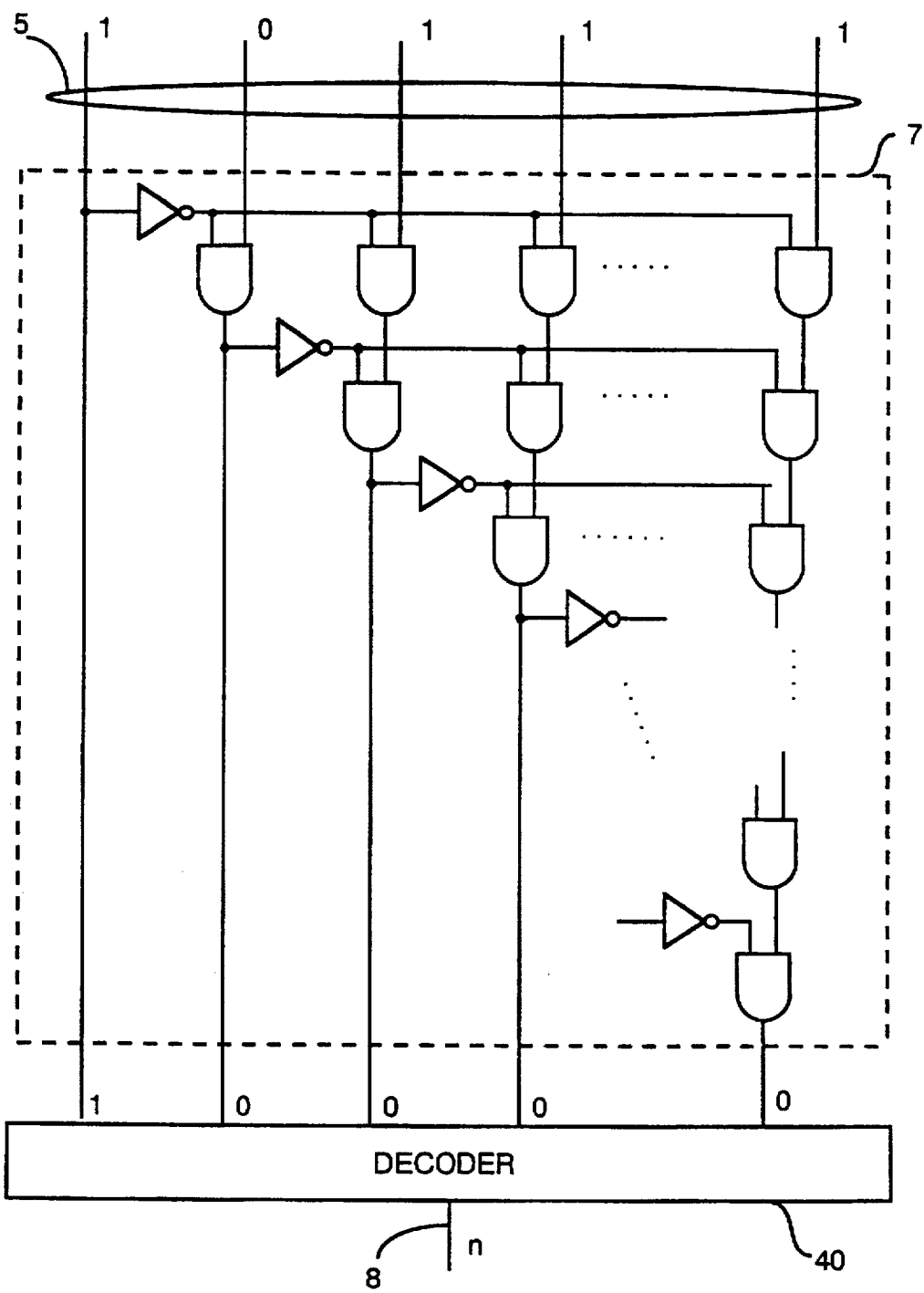
FIG. 5 shows value level judgement circuit used in an embodiment of the present invention.
Figure 13:
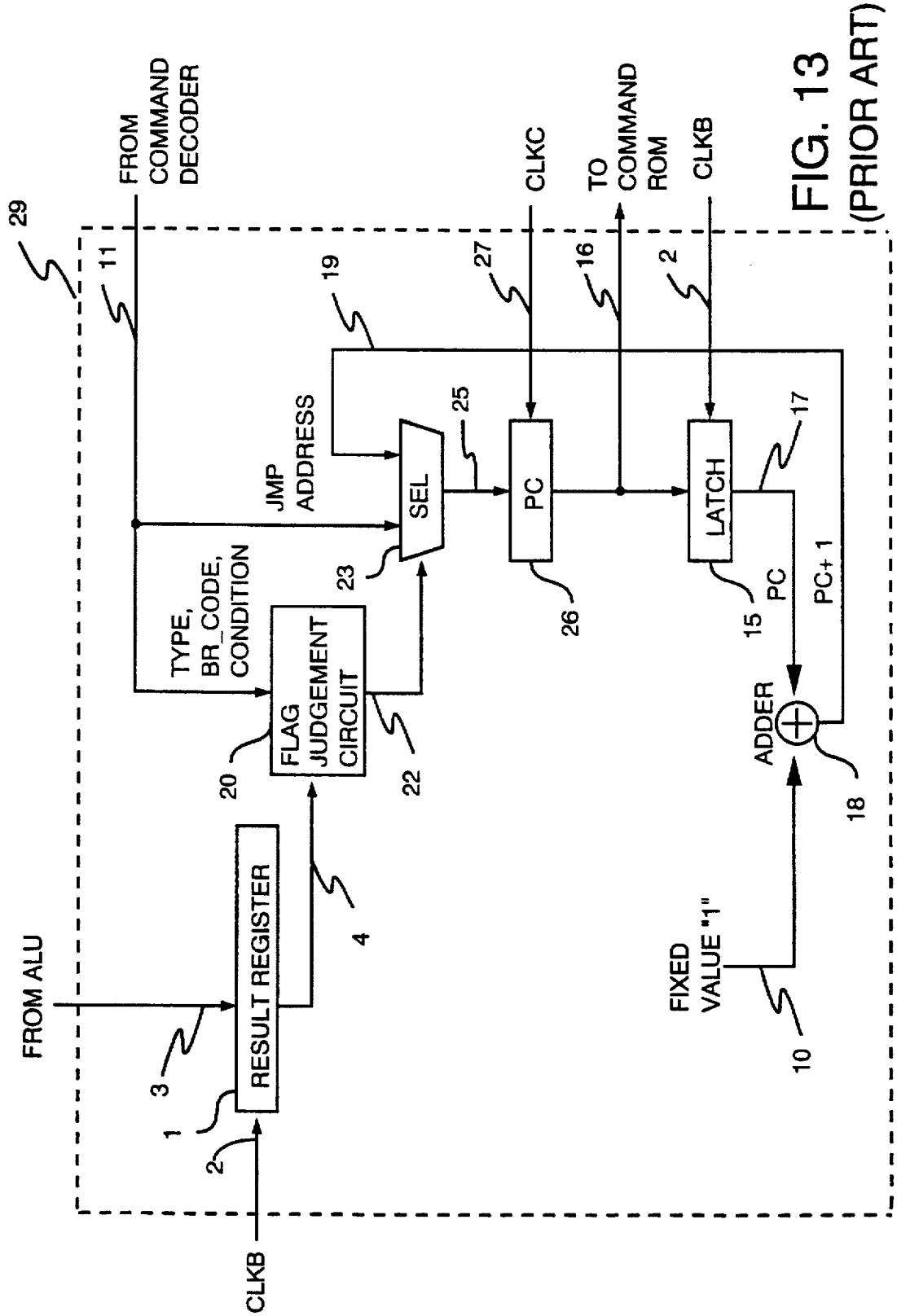
FIG. 13 shows a construction of a conventional address unit.
Figure 14:
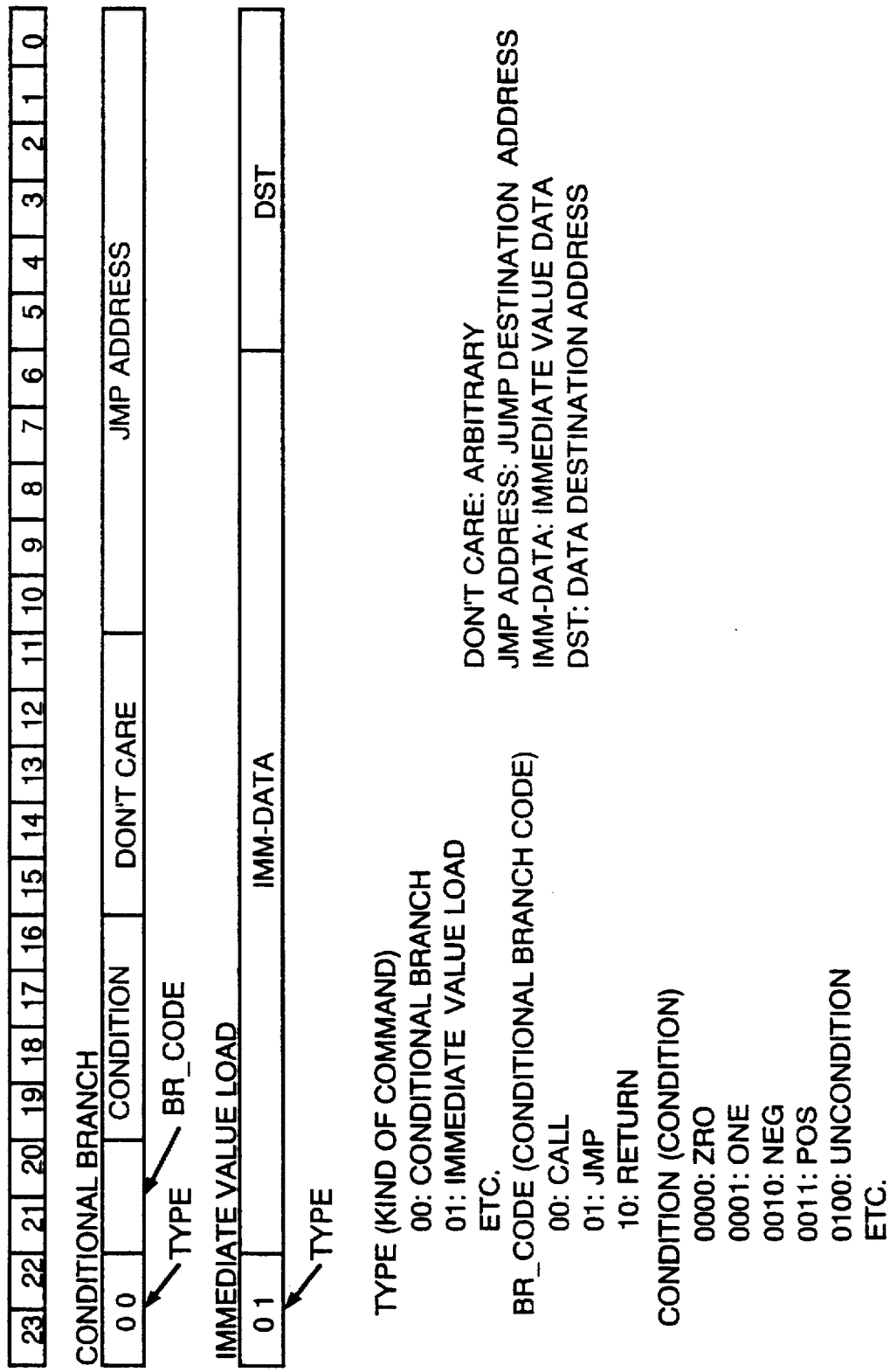
FIG. 14 shows a conventional command format.
Figure 15:
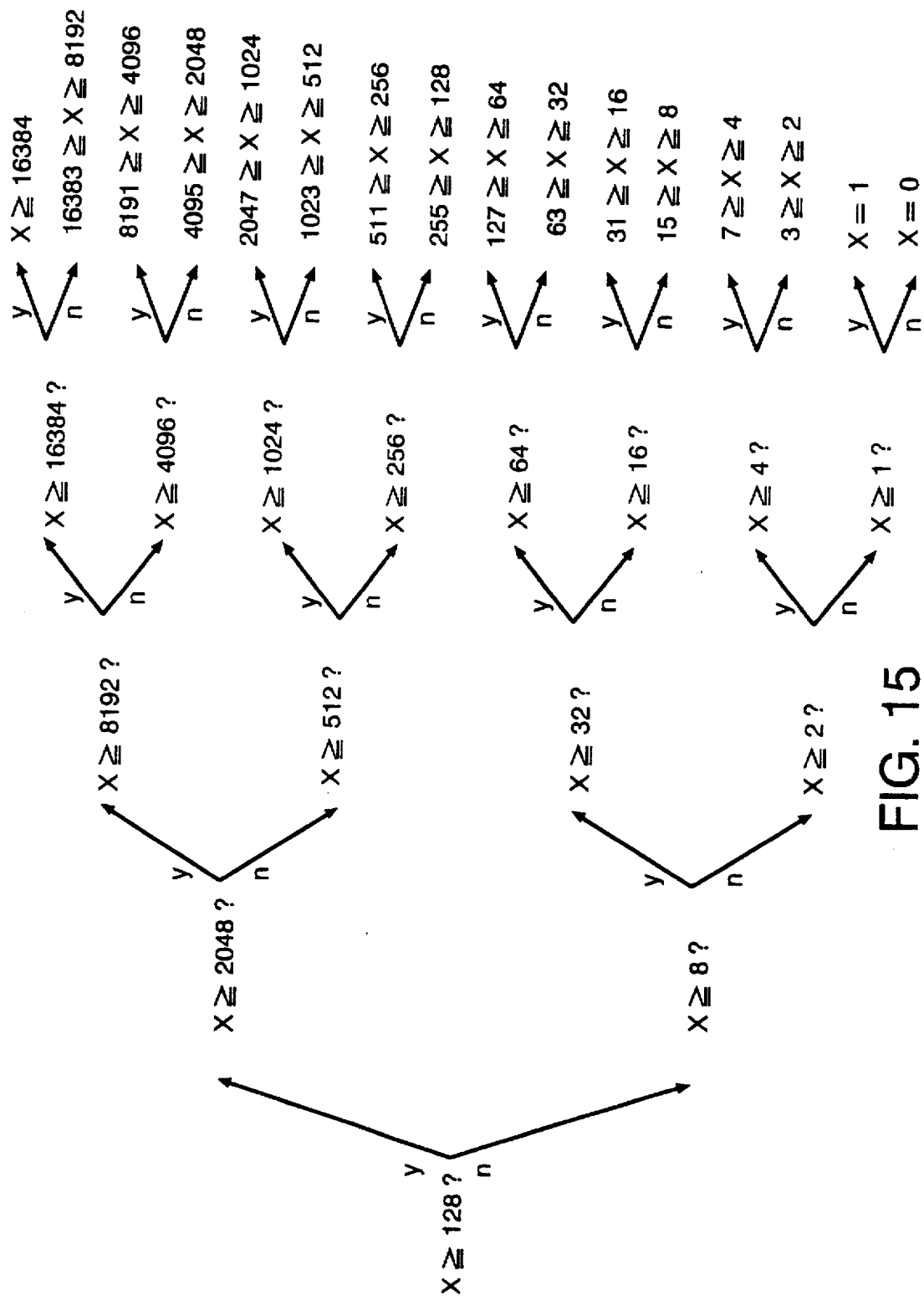
FIG. 15 shows steps of a conventional value level judgement.
Figure 17:
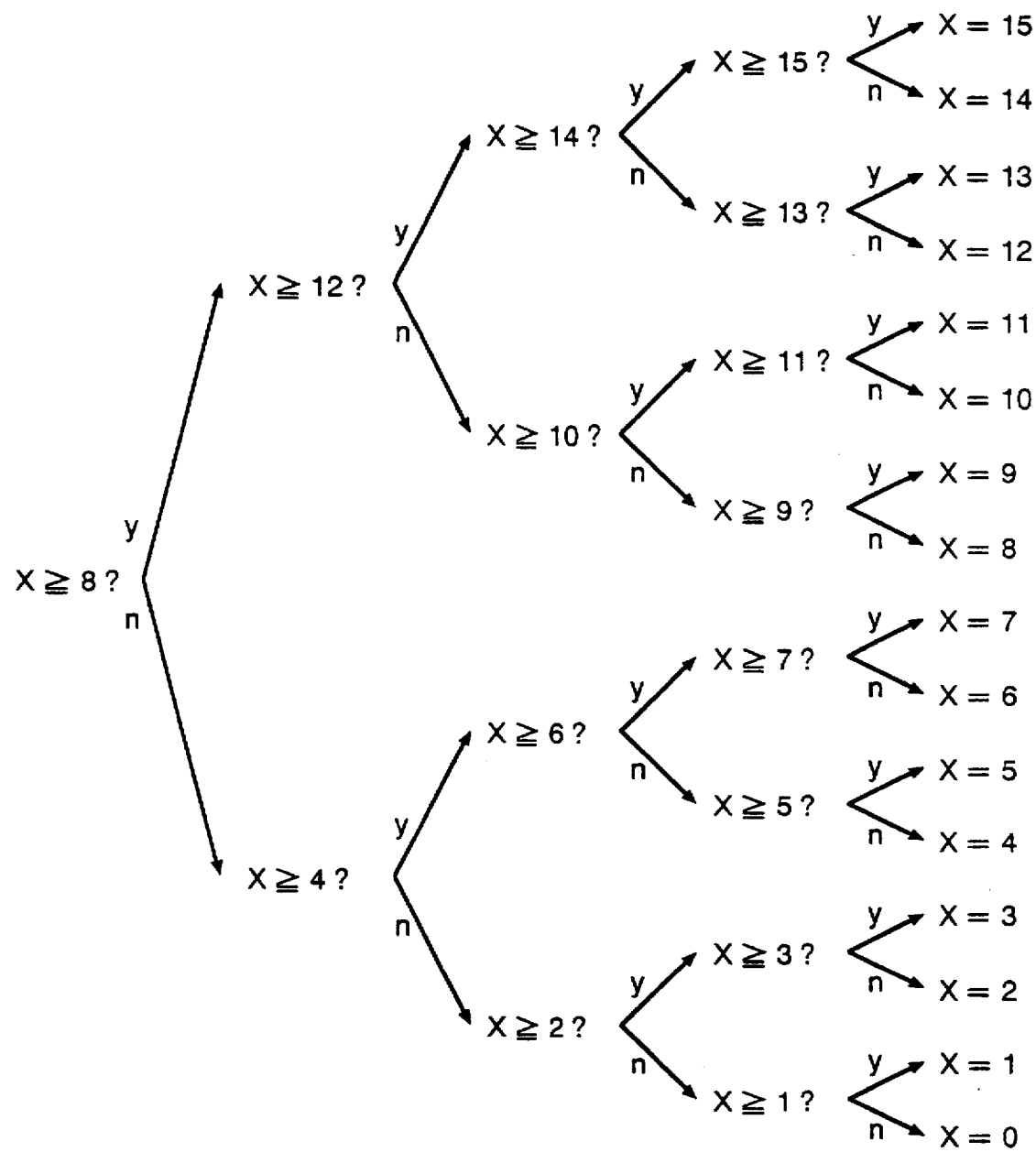
FIG. 17 shows steps of a conventional value level judgement.

In FIG. 1, a result register 1 stores a processed result received from ALU 33 according to a clock CLKB on signal line 2, and then outputs a stored value to signal line 4 for FLAG judgement. This register 1 also outputs only an immediate value to signal line 5, among values stored for value level judgement. Value level judgement circuit 7 judges where an input data value X is included among value level judgement ranges shown in FIG. 4, and outputs a judgement result to decoder 40. Decoder 40 in FIG. 5 outputs judgement result to selector 9 via signal line 8. Selector 9 selects either one of an input data 8 (value level judgement result), a fixed value "1" on signal line 10 for incrementing a value of program counter by "1", or an address displacement (disp) on signal line 12, according to kinds of commands (type), conditional branch code (br_code), and conditions (condition) on signal line 11, and then outputs a result to signal line 14. Adder 18 adds a program counter PC which is an output from latch 15, and an output result from selector 9. Explanations for numerals 15~27 is omitted here since it is the same as that of in FIG. 13. One example of this value level judgement circuit is shown in FIG. 5.

With reference to FIG. 1, an operation is explained as to how conditional branch according to value level judgement is carried out effectively and in a high-speed. In FIG. 3, we assume that the command codes on signal line 11 comprises bits 28, 27 (type), bits 26, 25 (br_code) and bits 24~21 (condition) in a conditional branch command according to value level judgement, and those bits are "00 (conditional branch)", "11 (sw)", "0100 (mag)", respectively.

Figure 6:
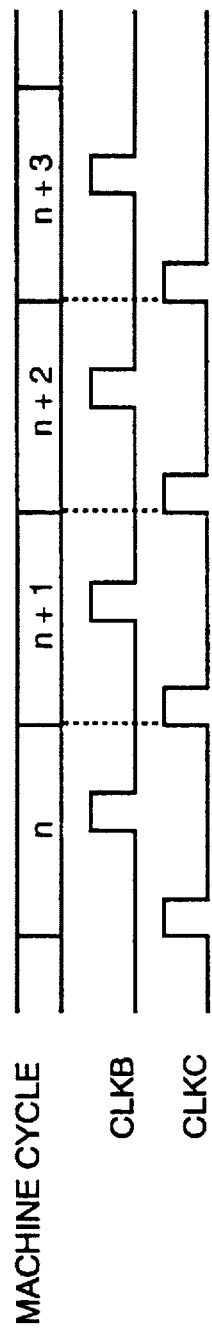
FIG. 6 shows a machine cycle and a clock timing.

As shown in FIG. 6, when clock CLKB on signal line 2 became "H", result register 1 stores a processing result X of ALU 33 in FIG. 12, and then outputs only a calculated result (except an overflow flag from ALU 33 and carrier flag etc.) among values stored to signal line 5 for value level judgement. A value level judgement circuit 7 outputs a value level judgement result to decoder 40 in response to input data (X) on signal line 5 in a manner shown in FIG. 7. This decoder 40 outputs a decoded result to signal line 8. Selector 9 selects input data on signal line 8 which is a result of value level judgement, and outputs it to signal line 14, only when bits 28, 27 are "00", bits 26, 25 are "11", and bits 24~21 are "0100" in a command code on signal line 11, namely when the conditional branch command is executed according to value level judgement.

On the other hand, latch 15 stores a current value of program counter on signal line 16, and the outputs stored value to signal line 17. Adder 18 adds an output from latch 15 (value of program counter) and a value level judgement result on signal line 14 for every machine cycle, and outputs the result to signal line 19. Selector 23 selects a data on signal line 19 and a command code (jmp address) on signal line 11 to output it to signal line 25. In other words, selector 23 outputs a "value of program counter"+"a value level judgement result" to signal line 25.

The operation when clock CLKB on signal line 2 in FIG. 6 became "L" is similar to that of prior art. That is, program counter 26, which stores program counter value, outputs the stored value in response to clock CLKC on signal line 27, namely an updated value of program counter, to signal line 16.

Figure 8:
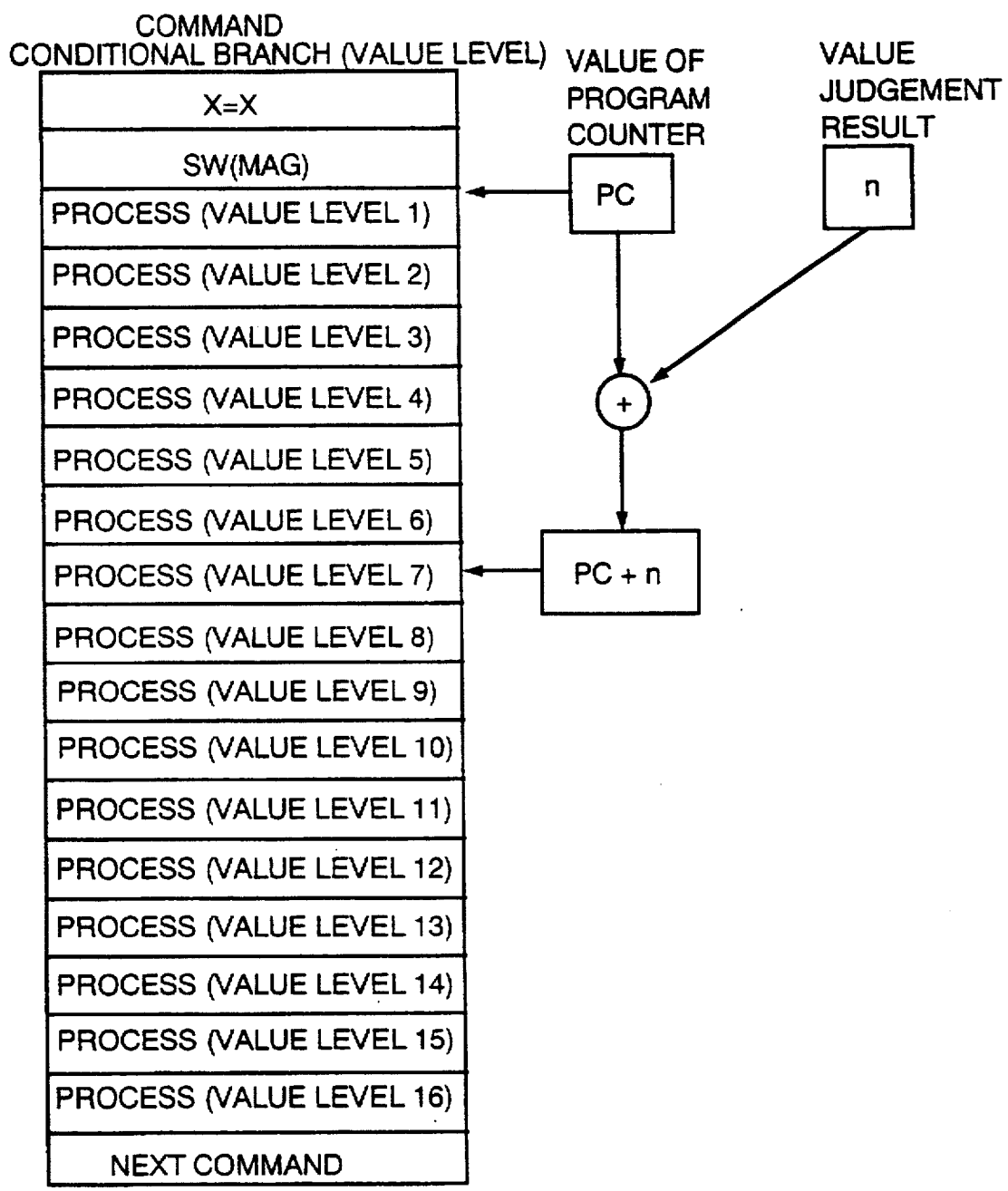
FIG. 8 shows briefly an operation of the first embodiment of the present invention.

As described above, in this embodiment, value level judgement circuit 7 carries out value level judgement for inputted numerical values, and adds a value of program counter and a value level judgement result as shown in FIG. 8, executes conditional branch in command ROM 28 according to a counting value of the added result. This process is explained in detail below. First, since a program counter PC is at a position of X=X, an output from ALU 33 becomes X. Next, program counter PC is incremented by one for a usual calculation process of the ALU to point SW (mag). In this occasion, since the SW command is carried out by using the preceding ALU calculation result, if a value level judgement result of X is n, the next program counter PC value becomes the current "PC value"+"n". FIG. 8 shows an operation in case of n=7, and a program counter moves to processing 7.

Accordingly, this embodiment advantageously carries out conditional branch using value level judgement within one machine cycle, without three processing necessary for prior art, namely loading threshold value, subtracting threshold value from inputted numerical values, and conditionally branching according to judgement of subtraction result. Here, a command "X=X" means that ALU command is outputted by through-state, that is, ALU reads out X from the register file, and outputs X as it is, and the register file again holds X. In other words, a result of X register becomes X again. Command "SW (mag)" is a conditional branch command, which changes the current program counting value of program counter by "preceding calculated result of ALU"+"1".

Embodiment 2

Figure 2:
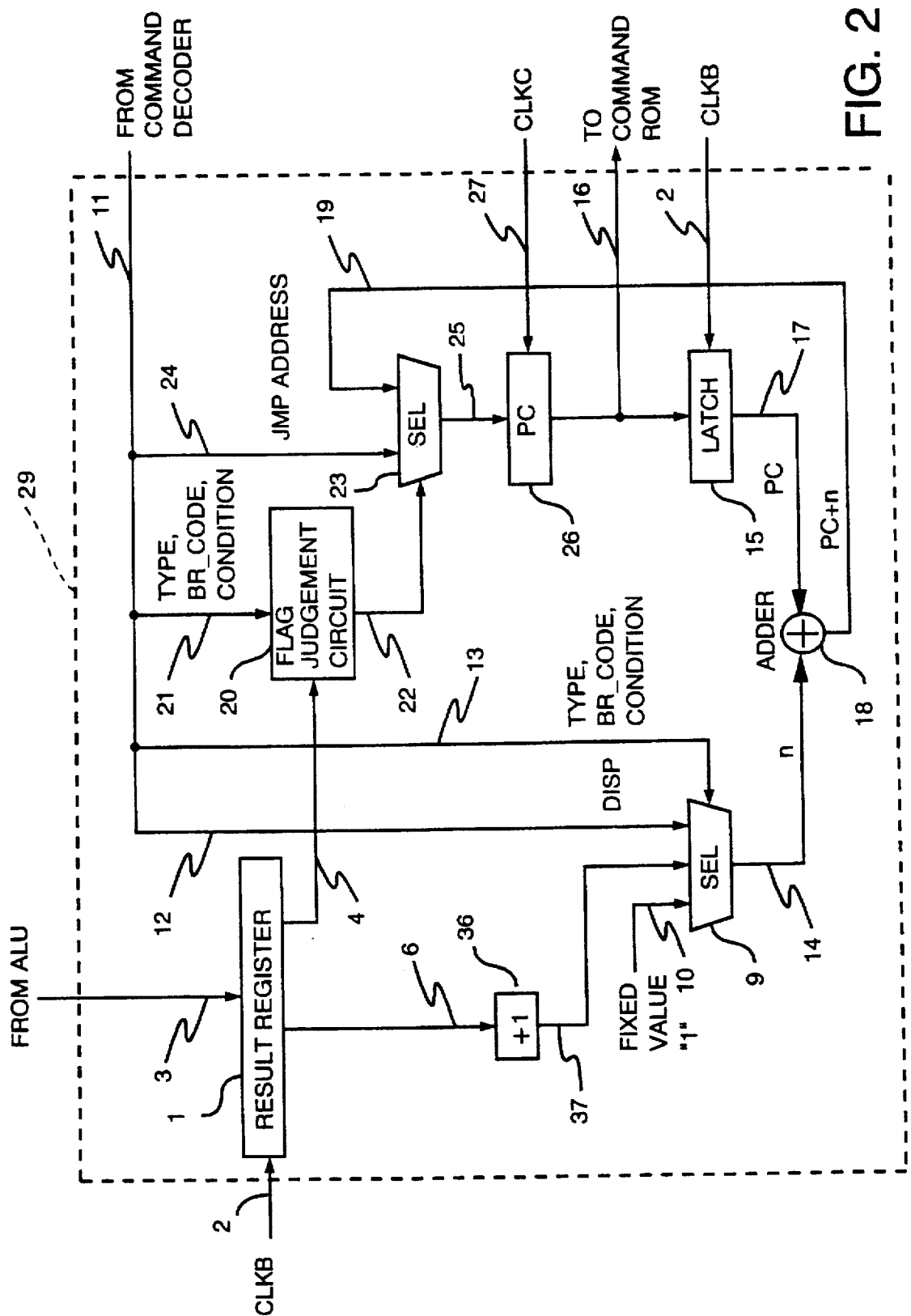
FIG. 2 shows a construction of an address unit of a second embodiment of present invention.

FIG. 2 is a block diagram showing another embodiment of a conditional branch operation according to a value judgement of the invention. A format of command codes on signal line 11 of FIG. 2 and FIG. 12 is similar to that of the first embodiment as shown in FIG. 3.

With reference to FIG. 2, an operation is explained as to how conditional branching according to value judgement is carried out effectively and at a high-speed. In this case, we assume that bits 28, 27 (type) is 00" (conditional branch), bits 26, 25 (br_code) is 11 (SW)", and bits 24-21 are 0101 (result)". Since a jump destination address is unnecessary for a conditional branch command according to value judgement, jump destination address of bits 10~0 may be any arbitrary values.

As shown in FIG. 6, when clock CLKB on signal line 2 became "H", result register 1 stores a processing result (X) of ALU 33 in FIG. 12, and then outputs only lower 4 bits of an immediate value among stored value to signal line 6 for value judgement. A value judgement circuit 36 adds "1" to an input data on signal line 6 and outputs a result as value judgement result to signal line 37. As shown in FIG. 9, a value judgement result becomes "lower 4 bits of input data of the immediate value on signal line 6"+"1". Selector 9 selects a value judgement result 37 and outputs it to signal line 14, only when bits 28, 27 of a command code on signal line 11 are "00", bits 26, 25 are "11" and bits 24-21 are "0101", namely only when the conditional branch command is executed according to value judgement.

Latch 15 stores a current value of program counter on signal line 16, then outputs a stored value to signal line 17. Adder 18 adds an output on signal line 17 from latch 15 (value of program counter) and a value level judgement result on signal line 14 from selector 19 in every machine cycle, and outputs a result to signal line 19. Selector 23 selects a data on signal line 19 to output to signal line 25. In other words, selector 23 outputs "value of program counter"+"value level judgement result" to signal line 25.

The operation when clock CLKB on signal line 2 in FIG. 6 became "L" is similar to that of prior art. That is, program counter 26, which stores program counter values, outputs the stored value, namely an updated value of program counter, to signal line 16, in response to clock CLKC on signal line 27.

Figure 10:
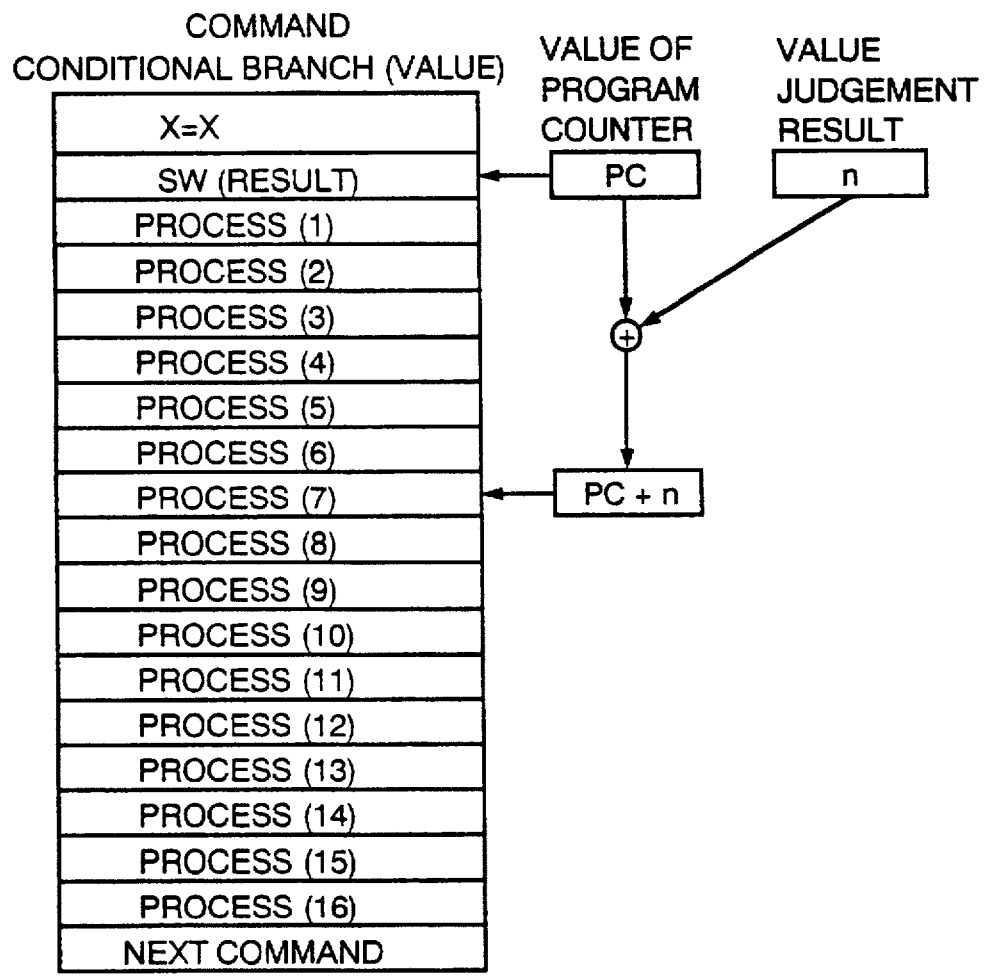
FIG. 10 shows briefly an operation of the embodiments of the present invention.

In other words, as shown in FIG. 10, this embodiment carries out the conditional branch operation according to a value judgement by simply adding the value judgement result to a value of program counter.

For example, a program counter PC is at the position of X=X, an output of ALU 33 becomes X. Next, program counter PC is incremented by one for a usual calculation of ALU to indicate SW (mag). Since SW command is executed using preceding ALU calculation result, if a value level judgement result of X is n, then the next program counter PC value becomes "current PC value"+"n". FIG. 10 shows a calculation process in case of n=7, and a program counter moves to process 7. Accordingly, this embodiment can carry out conditional branch by value judgement in one machine cycle.

Embodiment 3

Figure 11:
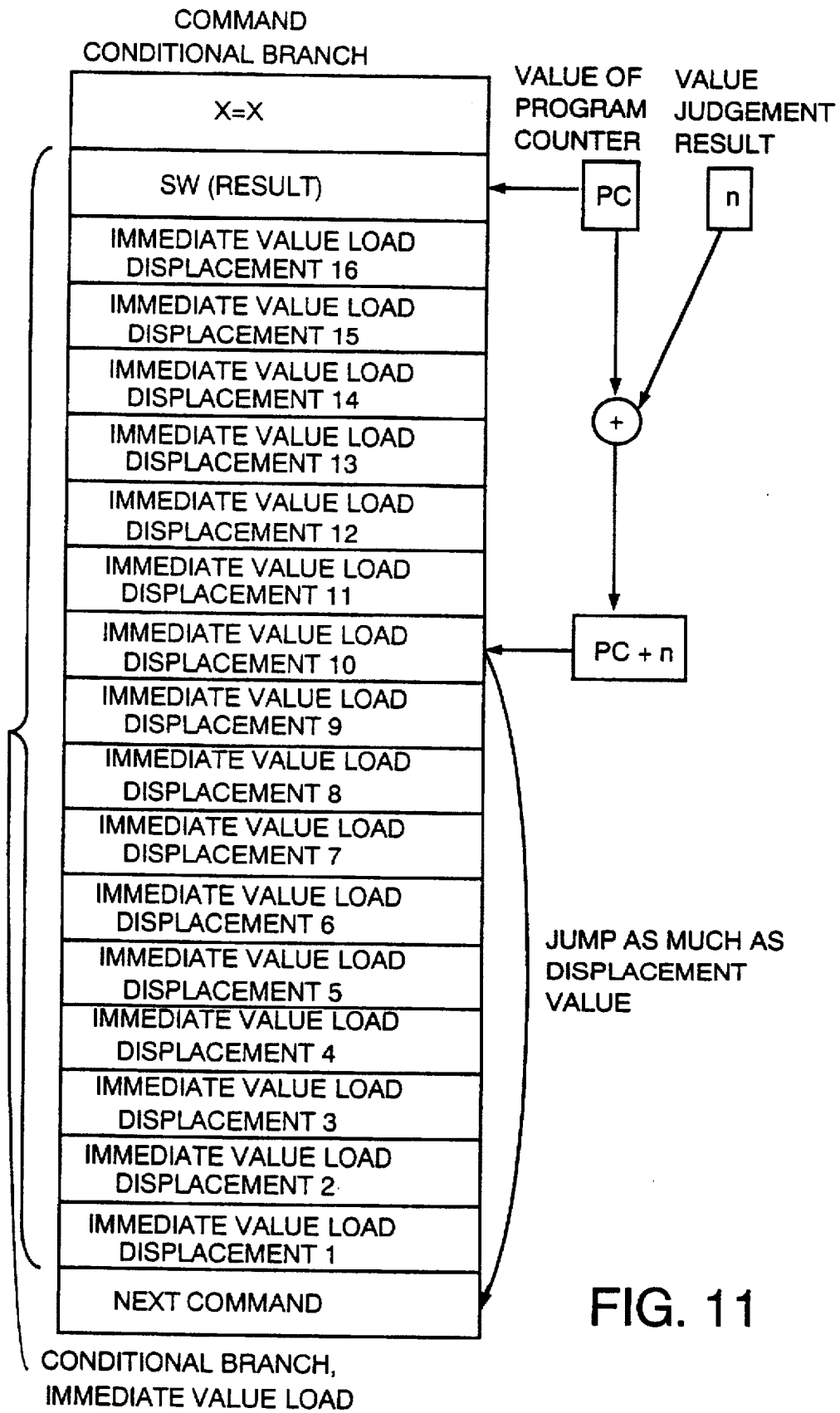
FIG. 11 shows briefly an operation of the embodiments of the present invention.

FIG. 11 is a block diagram which carries out an immediate loading according to an embodiment of the present invention. In FIG. 11, the process to move to PC+n is the same as that explained in FIG. 10. The difference is that contents of PC+n is immediate load commands in case of FIG. 11. Immediate load command executes an immediate value, and then appoints a displacement. Here, a command "X=X" means that ALU command is outputted by thorough-state, that is, ALU reads out X from the register file, and outputs X as it is, and the register file again holds X. In other words, a result of X register becomes X again. Command "SW (result)" is a conditional branch command, which deviates the current value of program counter by "preceding calculated result of ALU"+"1".

In FIG. 11, since displacement (disp) is 10, the next value of program counter becomes equal to "current value of program counter"+"10". Even if n is a number other than 10, a sequential processes of immediate load and branching is executed by 2 steps, by appointing displacement values (disp) in advance into a ROM address and by executing the command on the address "PC+n".

A format of command codes on signal line 11 of FIG. 1 and FIG. 12 is explained in case when immediate load is executed using FIG. 3. Bits 28, 27 in FIG. 3 represents kinds (types) of commands and when bits 28, 27 are "01", they represent an immediate load command. When bits 28, 27 are "01", that is, in case of immediate load command, bits 26~11 represent immediate data (imm-data), while bits 10~6 represent both an immediate load and an address displacement (disp) for address displacement, and bits 5~0 represent a data transfer destination address (dst).

With reference to FIG. 1, and other figures, it is explained below how immediate load and unconditional jump after conditional branch according to value level judgement or value judgement is carried out efficiently and at a high-speed.

As shown in FIG. 6, when clock CLKB on signal line 2 became "H", selector 9 selects an address displacement (disp) data for bits 10~6 in a command code on signal line 11 from signal line 12, and outputs it to signal line 14 when bits 28, 27 of command code on signal line 11 is "01", namely only for an immediate load command. Latch 15 stores a current value of program counter and then outputs a stored value to signal line 17. Adder 18 adds an address displacement (disp) and a program counter output on signal line 17 from latch 15 where a value of program counter is stored for every machine cycle, and outputs a result to signal line 19. Selector 23 selects a data on signal line 19 and outputs it to signal line 25. Accordingly, in this case, selector 23 outputs "value of program counter"+"value of an address displacement" to signal line 25.

The operation when clock CLKB on signal line 2 in FIG. 6 became "L" is similar to that of that previously discussed prior art. That is, program counter 26, which stores program counter values, outputs the stored value in response to clock CLKC on signal line 27, namely an updated value of program counter, to signal line 16.

In other words, in this embodiment, a value of the program counter is updated by adding an address displacement value to the value of program counter, when an immediate load is outputted. Therefore, this embodiment can execute the processing in one machine cycle, while the conventional processing has been executed in 2 machine cycles. By combining this third embodiment with the first or second embodiment, the conventional processing executed in 14 machine cycles can be abandoned in favor of the processing described in the above embodiments executed in 2 machine cycles.

What is claimed is:

1. An operating circuit comprising a command ROM for storing a program including a plurality of command codes, a program counter for appointing an address to said command ROM, a command decoder for decoding content of said command ROM appointed by said program counter, an arithmetic logical unit for processing contents of a register file according to a decoded result from said command decoder to produce calculated results, and an address unit for calculating a next address value in said command ROM according to the calculated results from said arithmetic logical unit, said operating circuit sequentially carrying out calculations according to the command codes in said command ROM, said address unit comprising:

a result register for storing and outputting a calculated result output from said arithmetic logical unit;

value level judgement means for judging a value level for the calculated result output from said result register and producing a value level judgement result indicative of the value level;

latch means for storing a current value of a program counter;

adder means for calculating a next value of said program counter by adding the value level judgement result from said value level judgement means and the current value of program counter stored in said latch means and for outputting the next value of said program counter as an added result; and first selector means receiving the added result for deciding a next command address in said command ROM, wherein a conditional branch is carried out to a command address corresponding to a value level obtained for the calculated result from said arithmetic logical unit, the command address being the added result.

2. The operating circuit of claim 1 further comprising:

a FLAG judgement circuit for decoding a command code type, a conditional branch code, and a condition, received from said command decoder, comparing the calculated result output from said result register to the condition, and outputting a result to said first selector means.

3. The operating circuit of claim 2 wherein said first selector means selects an output address from said adder means or a jump destination address included in an output from a command decoder according to the result output from said FLAG judgement circuit.

4. The operating circuit of claim 2 further comprising:

a decoder for receiving the value level judgement result from said value level judgement means and producing an output indicative of the value level judgement result;

a second selector for selecting a fixed value "1", the output from said decoder, or a value of an address displacement in said command decoder, according to a command code type, a conditional branch code, and a condition, received from said command decoder.

5. The operating circuit of claim 4 further comprising:

means for determining a displacement from a current program count value to a next program count value and for incrementing said program counter by the displacement value at the same time a calculation is carried out, in addition to normal operating commands, the calculation including a command code at a destination address where a conditional branch is carried out according to value level judgement or value judgement, and wherein the operating circuit carries out a branching process after said arithmetic logical unit has produced the value level judgement or the value judgement.

6. The operating circuit of claim 4 further comprising ADPCM encode/decode operating circuit means for executing conditional branch processing.

7. The operating circuit of claim 1 further comprising:

a decoder for receiving the value level judgement result from said value level judgement means and producing an output indicative of the value level judgement result;

a second selector for selecting a fixed value "1", the output from said decoder, or a value of an address displacement in said command decoder, according to a command code type, a conditional branch code, and a condition, received from said command decoder.

8. The operating circuit of claim 7 further comprising:

means for determining a displacement from a current program count value to a next program count value and for incrementing said program counter by the displacement value at the same time a calculation is carried out, in addition to normal operating commands, the calculation including a command code at a destination address where a conditional branch is carried out according to value level judgement or value judgement, and wherein the operating circuit carries out a branching process after said arithmetic logical unit has produced the value level judgement or the value judgement.

9. The operating circuits of claim 7 further comprising ADPCM encode/decode operating circuit means for executing conditional branch processing.

10. An operating circuit comprising a command ROM for storing a program, including a plurality of command codes, a program counter for appointing an address to said command ROM, a command decoder for decoding content of said command ROM appointed by said program counter, an arithmetic logical unit for processing contents of a register file according to a decoded result from said command decoder to produce calculated results, and an address unit for calculating a next address value in said command ROM according to the calculated results from said arithmetic logical unit, said operating circuit sequentially carrying out calculations according to command codes in said command ROM, said address unit comprising:

a result register for storing and outputting a calculated result output from said arithmetic logical unit;

value judgement means for producing a value judgement result indicative of a value of the calculated result by adding a "1" to a lowest order bit of the calculated result output from the said result register;

latch means for storing a current value of said program counter;

adder means for calculating a next value of said program counter by adding the value judgement result from said value judgement means and the current value of said program counter stored in said latch means and for outputting the next value of said program counter as an added result; and first selector means receiving the added result for deciding a next command address in said command ROM, wherein a conditional branch is carried out to a command address corresponding to a value obtained for the calculated result from said arithmetic logical unit, the command address being the added result.

11. The operating circuit of claim 10 further comprising:

a FLAG judgement circuit for decoding a command code type, a conditional branch code, and a condition, received from said command decoder, comparing the calculated result output from said result register to the condition, and outputting a result to said first selector means.

12. The operating circuit of claim 11 wherein said first selector means selects an output address from said adder means or a jump destination address included in an output from a command decoder according to the result output from said FLAG judgement circuit.

13. The operating circuit of claim 11 further comprising:

a second selector for selecting a fixed value "1", the value level judgement result output from said value judgement means, or a value of an address displacement in said command decoder, according to command code type, a conditional branch code, and a condition, received from said command decoder.

14. The operating circuit of claim 13 further comprising:

means for determining a displacement from a current program count value to a next program count value and for incrementing said program counter by the displacement value at the same time a calculation is carried out, in addition to normal operating commands, the calculation including a command code at a destination address where a conditional branch is carried out according to value level judgement or value judgement, and wherein the operating circuit carries out a branching process after said arithmetic logical unit has produced the value level judgement or the value judgement.

15. The operating circuit of claim 13 further comprising ADPCM encode/decode operating circuit means for executing conditional branch processing which appear frequently during ADPCM encode/decode operational processing.

16. The operating circuit of claim 10 further comprising:

a second selector for selecting a fixed value "1", the value level judgement result output from said value judgement means, or a value of an address displacement in said command decoder, according to a command code type, a conditional branch code, and a condition, received from said command decoder.

17. The operating circuit of claim 16 further comprising:

means for determining a displacement from a current program count value to a next program count value and for incrementing said program counter by the displacement value at the same time a calculation is carried out, in addition to normal operating commands, the calculation including a command code at a destination address where a conditional branch is carried out according to value level judgement or value judgement, and wherein the operating circuit carries out a branching process after said arithmetic logical unit has produced the value level judgement or the value judgement.

18. The operating circuit of claim 16 further comprising ADPCM encode/decode operating circuit means for executing conditional branch processing.

19. An operating method for sequentially carrying out calculations according to a plurality of command codes in a command ROM using an operating circuit comprising said command ROM for storing a program including the plurality of command codes, a program counter for appointing an address to said command ROM, a command decoder for decoding content of said command ROM appointed by said program counter, an arithmetic logical unit for processing contents of a register file according to a decoded result from said command decoder to produce calculated results, and an address unit for calculating a next address value in said command ROM according to the calculated results from said arithmetic logical unit, the method comprising the steps of:

storing and outputting a calculated result received from said arithmetic logical unit;

determining a value level judgement result indicative of a value level of the calculated result;

storing a current value of said program counter;

calculating a next value of said program counter by adding the value level judgement result and the current value of said program counter and outputting the next value of said program counter as an added result; and receiving the added result and deciding a next command address in said command ROM, the next command address being the added result, and conditionally matching to a command address corresponding to a value level obtained for the calculated result from said arithmetic logical unit.

20. The operating method of claim 11 including decoding a command code type, a conditional branch code, and a condition, received from said command decoder, comparing the calculated result output from said result register to the condition, for deciding the next command address.

21. An operating method for sequentially carrying out calculations according to a plurality of command codes in a command ROM, using an operating circuit comprising said command ROM for storing a program including the plurality of command codes, a program counter for appointing an address to said command ROM, a command decoder for decoding a content of said command ROM appointed by said program counter, an arithmetic logical unit for calculating contents of a register file according to decoded result from said command decoder to produce calculated results, and an address unit for calculating a next address value in said command ROM according to the calculated results from said arithmetic logical unit, the method comprising the steps of:

storing and outputting a calculated result received from said arithmetic logical unit;

producing a value level judgement result indicative of a value of the calculated result by adding a "1" to a lowest order bit of the calculated result;

storing a current value of said program counter;

calculating a next value of said program counter by adding the value judgement result and the current value of said program counter to produce an added result; and receiving the added result and deciding a next command address in said command ROM, the next command address being the added result and conditionally branching to a command address corresponding to a value obtained for the calculated result from said arithmetic logical unit.

22. The operating method of claim 21 including decoding a command code type, a conditional branch code, and a condition, received from said command decoder, comparing the calculated result output from said result register to the condition, for deciding the next command address.

* * * * *

UNITED STATES PATENT AND TRADEMARK OFFICE
CERTIFICATE OF CORRECTION

PATENT NO.   : 5,764,941
DATED        : June 9, 1998
INVENTOR(S)  : Goto et al.

It is certified that error appears in the above-identified patent and that said Letters Patent is hereby corrected as shown below:

Column 16, Line 35, change "11" to --19--.

Signed and Sealed this

Tenth Day of November 1998

Attest:

BRUCE LEHMAN

Attesting Officer       Commissioner of Patents and Trademarks